US 8,787,640 B2

(12) United States Patent
Hirano

(10) Patent No.: US 8,787,640 B2
(45) Date of Patent: Jul. 22, 2014

(54) IMAGE PROCESSING SYSTEM, METHOD, PROGRAM, AND STORAGE MEDIUM TO IMPLEMENT UNIVERSAL COLOR DESIGN

(75) Inventor: Masanori Hirano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/584,107

(22) Filed: Aug. 13, 2012

(65) Prior Publication Data

US 2013/0057923 A1  Mar. 7, 2013

(30) Foreign Application Priority Data

Sep. 5, 2011 (JP) ................................. 2011-192998

(51) Int. Cl.
*G06K 9/00* (2006.01)

(52) U.S. Cl.
USPC .......................................... 382/128; 358/3.06

(58) Field of Classification Search
None
See application file for complete search history.

(56) References Cited

U.S. PATENT DOCUMENTS

| 6,760,123 | B1 * | 7/2004 | Harrington et al. ............ 358/1.9 |
| 7,499,198 | B2 | 3/2009 | Hirano |
| 7,710,606 | B2 | 5/2010 | Suzuki et al. |
| 7,710,620 | B2 | 5/2010 | Sakakibara et al. |
| 7,782,486 | B2 | 8/2010 | Nakano et al. |
| 7,924,465 | B2 | 4/2011 | Ike et al. |
| 8,011,756 | B2 | 9/2011 | Ike et al. |
| 8,186,793 | B2 | 5/2012 | Hosaka et al. |
| 2006/0092206 | A1 | 5/2006 | Kimura et al. |
| 2006/0098232 | A1 | 5/2006 | Nakano et al. |
| 2007/0091135 | A1 | 4/2007 | Hosaka et al. |
| 2008/0123146 | A1 * | 5/2008 | Ike et al. ...................... 358/3.13 |
| 2008/0278764 | A1 | 11/2008 | Hirano et al. |
| 2009/0058910 | A1 | 3/2009 | Hatanaka et al. |
| 2009/0167804 | A1 | 7/2009 | Kikuchi et al. |
| 2009/0179934 | A1 | 7/2009 | Takagi et al. |
| 2009/0316236 | A1 | 12/2009 | Sakakibara et al. |
| 2010/0134810 | A1 | 6/2010 | Shimamura et al. |
| 2011/0141528 | A1 | 6/2011 | Hirano et al. |

FOREIGN PATENT DOCUMENTS

| JP | 2003-223635 | 8/2003 |
| JP | 2004-178513 | 6/2004 |
| JP | 2011-066523 | 3/2011 |
| WO | WO2009/020115 A1 | 2/2009 |

* cited by examiner

*Primary Examiner* — Firmin Backer
*Assistant Examiner* — Christopher D Wait
(74) *Attorney, Agent, or Firm* — Harness, Dickey & Pierce, P.L.C.

(57) ABSTRACT

An image processing system that facilitates process of color universal design that enables people with color amblyopia to recognize color difference as image pattern without changing characteristic of coloration and gradation and people with no disabilities who look the same image to feel less discomfort. A hue determining unit 102 determines hue of image data, and a selecting unit 105 selects halftone processing in accordance with the determined hue. If the selected halftone processing is dithering process that uses AM dithering, a halftone processing unit 106 executes halftone processing with different line per inch depending on the determined hue.

7 Claims, 5 Drawing Sheets

FIG. 3
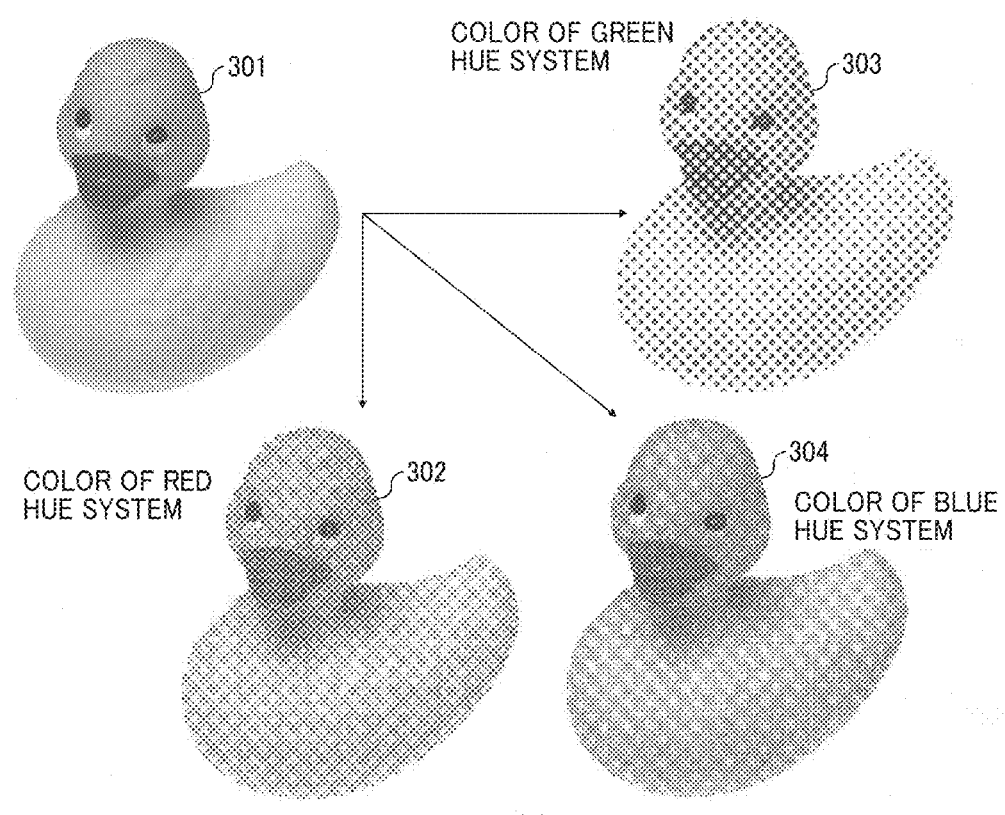
(a)
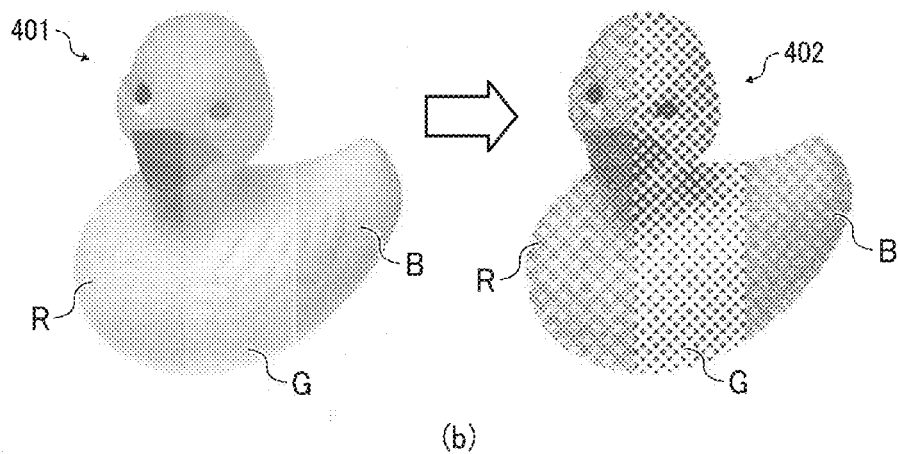
(b)

FIG. 4
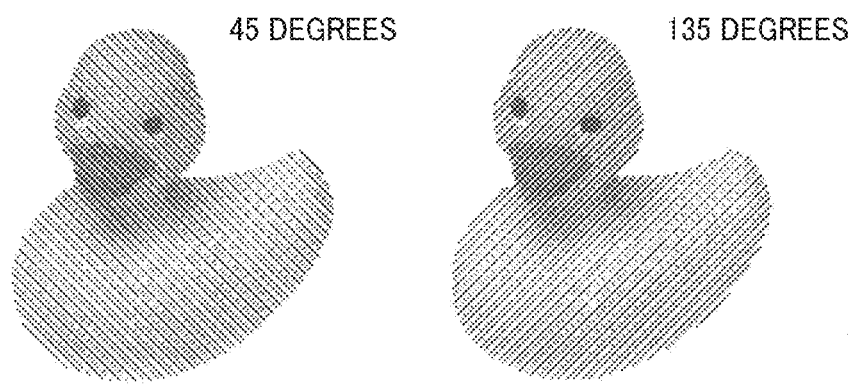
(a) EXAMPLE OF DIFFERENCE IN SCREEN ANGLES
(LINE SCREEN DITHER)
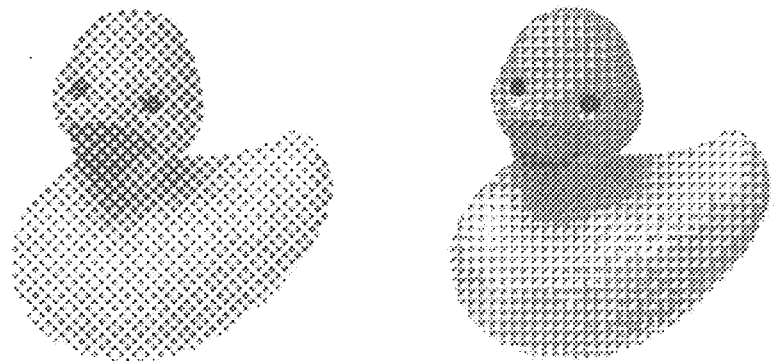
(b) EXAMPLE OF DIFFERENCE IN HALFTONE DOT PATTERNS
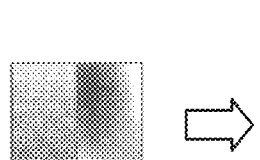
(c) THIRD DIMENSION EVOKING PATTERN
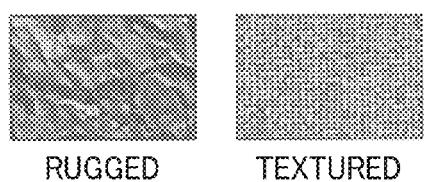
(d) TEXTURE EVOKING PATTERN FIG. 5
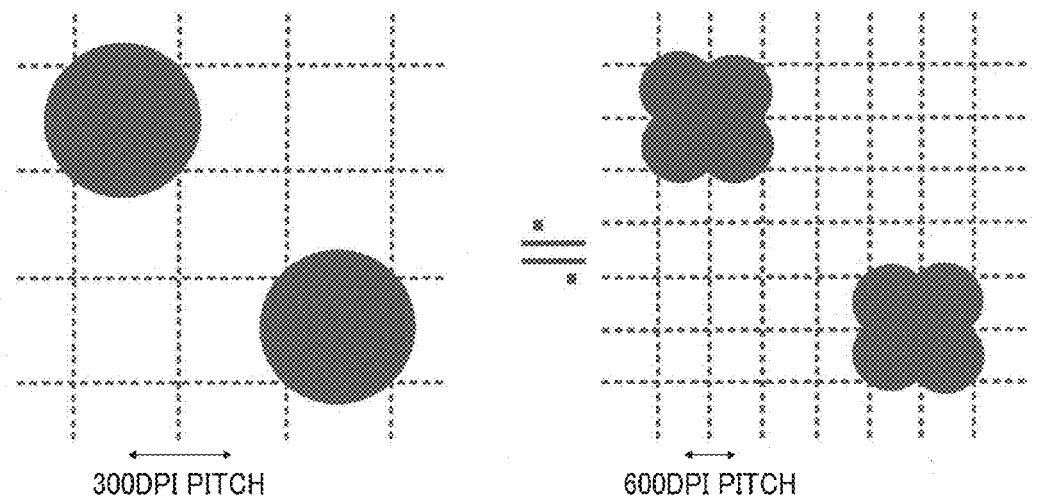
300DPI PITCH    600DPI PITCH
(a) IMITATE LOW RESOLUTION DOT BY CONGREGATING HIGH RESOLUTION DOTS (AGGREGATE)
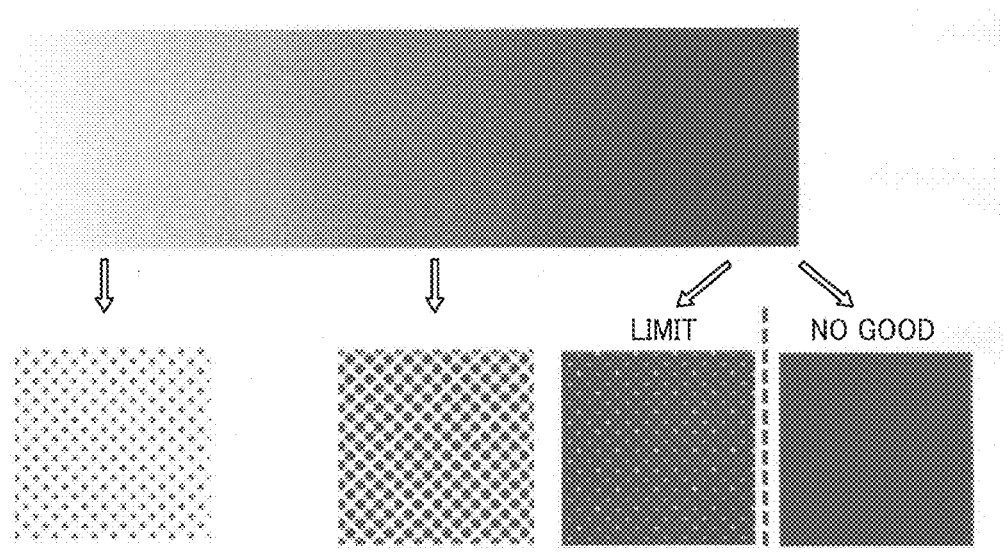
LIMIT    NO GOOD
(b) HALFTONE PROCESSING PATTERN RECOGNITION LIMIT

IMAGE PROCESSING SYSTEM, METHOD, PROGRAM, AND STORAGE MEDIUM TO IMPLEMENT UNIVERSAL COLOR DESIGN

CROSS-REFERENCE TO RELATED APPLICATION

This patent application is based on and claims priority pursuant to 35 U.S.C. §119 to Japanese Patent Application No. 2011-192998 filed on Sep. 5, 2011, the entire disclosure of which is hereby incorporated by reference herein.

BACKGROUND OF THE INVENTION

1. Field of the Invention

The present invention relates to an image processing system, an image processing method, an image processing program, and a storage medium that stores the program for executing the image processing method on a computer, and more particularly, to an image processing system, method, program, and storage medium that implements color universal design.

2. Description of the Related Art

Conventionally, as an example of a practical application of color universal design that takes into account the disability of people with color amblyopia, converting color schemes of control panels, operation screens, and important parts of apparatuses into colors that people with color amblyopia can easily recognize exists. As for image outputting apparatuses, just such a method of color conversion has been proposed (e.g., JP-2003-223635-A), as has a method that adds different patterns and textures to each color (e.g., JP-2004-178513-A).

However, while the methods described above can satisfy the fundamental principle of color universal design, i.e., to facilitate image recognition for people with color amblyopia, it is not always true that people with no disabilities can have a sense of satisfaction when they look at printouts applying color universal design.

For example, with the method that converts colors used in an image into colors that people with color amblyopia can easily recognize, while it is effective enough if individual colors can be distinguished or the fact that a highlighted part is colored can be recognized as in the case of text, line drawings, and graphs, the number of colors that can be used to that effect is severely limited and sometimes it is difficult to convert an image that uses many colors.

Also, as for images whose original color scheme is well-known and objects whose proper color scheme is popular, such as specific persons, animals, still lives, natural things, artifacts, characters, trademarks, and designs, sometimes remarkably different and unintended impressions can be produced by the color conversion described above. Since there are various types among people with color amblyopia whose color vision has different characteristics and it is normally assumed that people with no disabilities also utilize the same objects, applying color universal design coloration to image data that have normal coloration can bring users discomfort.

As for the method that adds different patterns and textures to each color, discomfort due to difference in colors is not evoked since the coloration itself does not change. However, the situation is the same as the former color conversion described above, in that the kinds of patterns and textures that can be utilized are not enough compared to number of colors supposed to be used, and in some cases color density is changed depending on the pattern (gradation characteristics are changed.) Generally speaking, human beings are sensitive to irregular gradation (reversion and discontinuity.) In addition, since people with color amblyopia are especially sensitive to change in contrast and color tone compared to people with no disabilities, failure in gradation balance can cause discomfort to people with color amblyopia.

Moreover, since adding texture is a process that intentionally adds noise data that does not exist in the original data, that basically degrades the image quality. Also, sometimes a texture can produce a three-dimensional impression even though it is a two-dimensional pattern, as can be seen with reference to FIGS. 4 (c) and (d). Selection of a texture pattern that does not suit the solidity of the original image can confuse the user.

It is not easy for all creators to share common perceptions to try to create documents by selecting number of colors and coloration carefully keeping true color universal design in mind to avoid the issues described above. Color universal design-conscious coloration drastically limits freedom of presentation, and processing and searching for suitable images takes excessive effort for users who want to make them luxurious intentionally to catch viewers' attention.

BRIEF SUMMARY OF THE INVENTION

The present invention provides a novel image processing system, method, and storage medium that facilitates color universal design that enables people with color amblyopia to recognize color difference as an image pattern without changing coloration and gradation while enabling people with no disabilities who view the same image to feel less discomfort.

More specifically, the present invention provides an image processing system that enables people with color amblyopia to recognize color difference by recognizing difference in granularity vision by changing the number of lines per inch (LPI) or resolution for each hue, R, G, and B, and keeping the original image coloration, since sensitivity of people with color amblyopia is different from people with no disabilities.

The present invention also provides a novel image processing system that processes color universal design and has a determining unit that determines hue of an image, a selecting unit that selects halftone processing in accordance with the determined hue, and a processing unit that converts the image into image with different granularity degree using the selected halftone processing.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in conjunction with the accompanying drawings, wherein:

FIG. 3 is a diagram illustrating halftone processing according to the present invention;

FIG. 4 is a diagram illustrating examples of different screen angles and different halftone dots; and FIG. 5 is a diagram illustrating processes as an embodiment of the present invention.

DETAILED DESCRIPTION OF THE PREFERRED EMBODIMENTS

Figure 1:
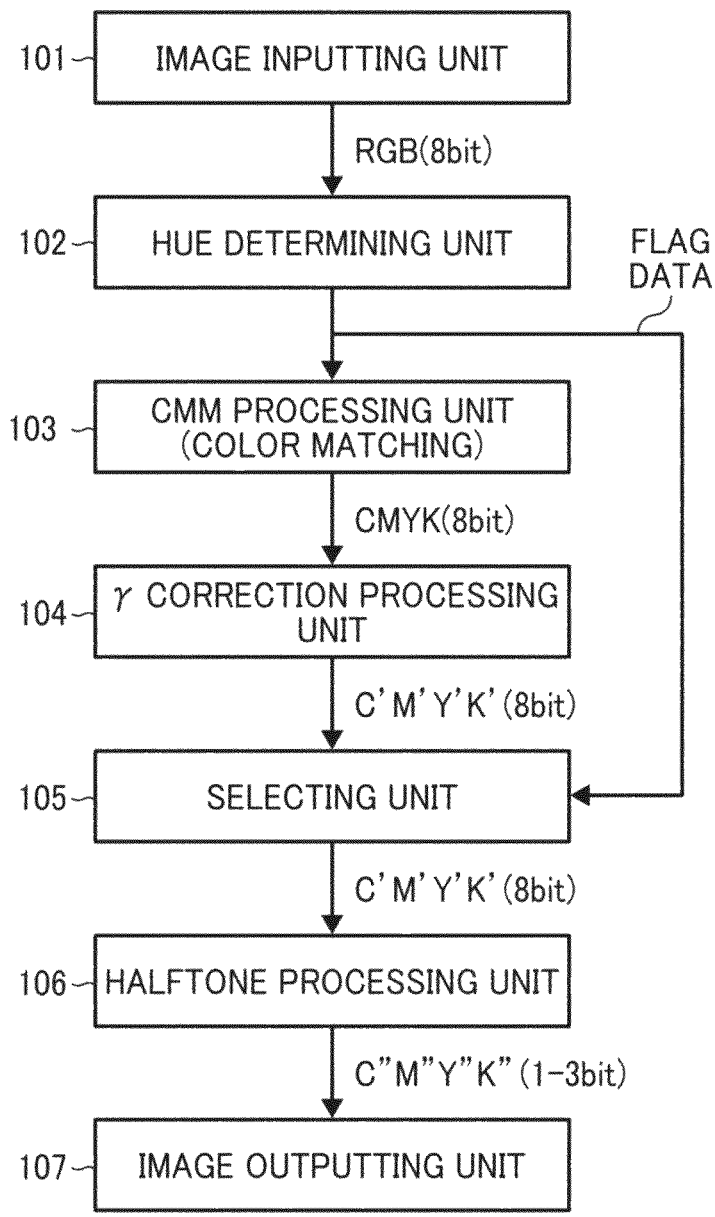
FIG. 1 is a block diagram illustrating a configuration of an image processing system as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

First Embodiment

An embodiment of the present invention will be described in detail below with reference to the drawings.

Human beings recognize colors based on impulses from L cones that respond to stimuli of the color red (R), M cones that respond to green (G), and S cones that respond to blue (B). People with color amblyopia are not good at recognizing colors compared to people with no disabilities since their cones are not well-balanced or are malfunctioning. That is, whether or not people with color amblyopia can recognize colors depends on whether the input color belongs to the red, green, or blue color system.

FIG. 1 is a block diagram illustrating a configuration of an image processing system as an embodiment of the present invention. In FIG. 1, an image inputting unit 101 acquires images from apparatuses such as personal computers (PCs) and multifunctional peripherals (MFPs). A hue determining unit 102 determines hue of the input image data. A color matching method (CMM) processing unit 103 converts RGB signals into CMYK signals. A γ correction processing unit 104 corrects gradation characteristics of the input image data. A selecting unit 105 selects halftone processing in accordance with the hue. A halftone processing unit 106 executes the halftone processing on the input image data using dithering and error diffusion and converts the input image into an image with a different granularity degree from the original image. An image outputting unit 107 is an apparatus such as an inkjet or electrophotographic printer.

Figure 2:
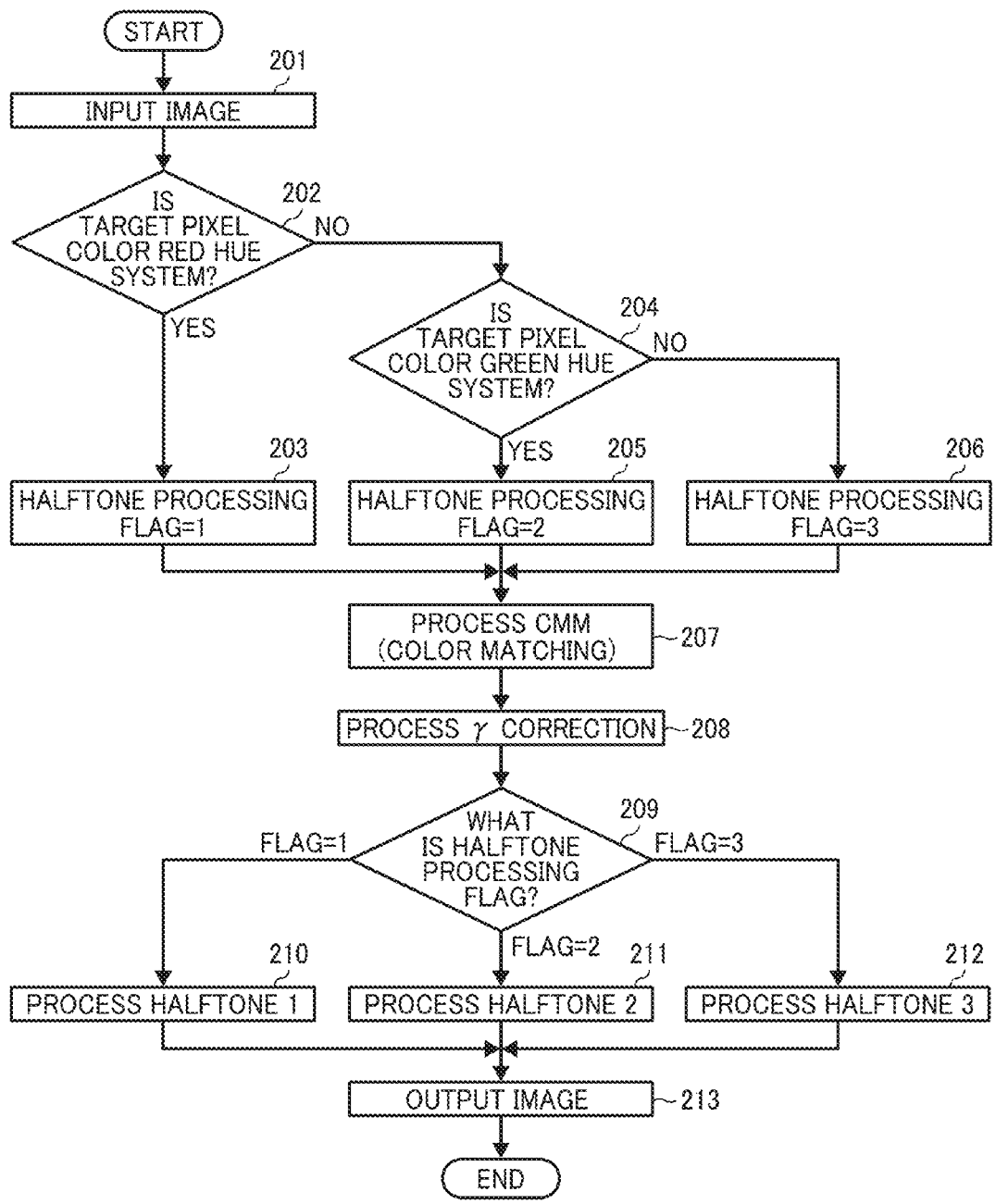
FIG. 2 is a flowchart illustrating an image processing method as an embodiment of the present invention.

FIG. 2 is a flowchart illustrating steps in an image processing method as an embodiment of the present invention. The hue determining unit 102 determines which hue colors used in input image data belong to which system, i.e., red system, green system, or blue system, and switches image processing of the halftone processing unit 106 accordingly. Generally speaking, image data handled by computers is managed by using the RGB color system, so the hue determining unit 102 determines which component has the largest value, red, green, or blue, for each pixel of the input image data, for example.

Hue area to which input image data belongs=max(R, G, B)

If the hue determining unit 102 determines that hue of a targeted pixel belongs to R hue area (Yes in S202), the hue determining unit 102 sets a halftone processing flag to 1 (S203). If the hue determining unit 102 determines that hue of targeted pixel belongs to not R hue area (No in S202) but G hue area (Yes in S204), the hue determining unit 102 sets the halftone processing flag to 2 (S205). If the hue determining unit 102 determines that hue of targeted pixel belongs to not G hue area (No in S204) but B hue area, the hue determining unit 102 sets the halftone processing flag to 3 (S206).

The hue determining unit 102 executes the determination described above for all pixels of the input image data, and provides the flag data as the determining result to the selecting unit 105 described later.

In the example described above, the hue of each pixel is determined by the largest component among the R component, G component, and B component of the pixel. However, the present invention is not limited thereto. In another embodiment of the present invention, the hue area can be determined by a ratio of the three primary colors that reflects color vision of people with color amblyopia more exactly. More precisely, the hue area for each color among 1658 million colors can also be determined like a three-dimensional look up table (3D-LUT) used in color matching.

Next, the CMM processing unit 103 converts the RGB image data into CMYK image data (color matching) (S207), and the γ correction processing unit 104 corrects gradation characteristics of the CMYK image data to the intended output gradation characteristics (S208).

Next, the selecting unit 105 refers to the flag data (S209) and selects halftone process 1 if the flag of the targeted pixel is 1 (S210), selects halftone process 2 if the flag of the targeted pixel is 2 (S211), or selects halftone process 3 if the flag of the targeted pixel is 3 (S212).

The halftone processing unit 106 converts the CMYK image data into image data that has gradations in binary or small units by using the selected halftone processing, and the image outputting unit 107 prints out the image after executing the halftone processing (S213).

FIG. 3 is a diagram illustrating halftone processing executed as described above. In FIG. 3 (a), there is input image data 301 in RGB. A dot pattern image 302 is halftone processed by using the process of this invention in case the input image data 301 belongs to R hue area. A dot pattern image 303 is halftone processed by using the process of this invention in case the input image data 301 belongs to G hue area. A dot pattern image 304 is halftone processed by using the process of this invention in case the input image data 301 belongs to B hue area.

In the example described above, AM dithering is used as halftone processing, and the LPI is changed in response to hue. In this example, the LPI of B hue is the highest and its granularity degree (texture) is the lowest (halftone process 3), the LPI of G hue is the lowest and its granularity degree is the highest (halftone process 2), and the LPI of R hue is in the middle of them and its granularity degree is medium (halftone process 1).

Also, as shown in FIG. 3 (b), image data that has RGB hue areas is converted to image data 402 by the halftone processing of this embodiment. That is, in this embodiment, by changing the LPI of halftone processing for each RGB hue, color difference is expressed by difference in granularity degree (texture based on difference in LPI) while keeping the color tone of the original image, so that people with color amblyopia can recognize the difference and people with no disabilities who look the converted image feel less discomfort.

Second Embodiment

In the first embodiment, AM dithering is used as halftone processing. However, the present invention is not limited thereto, and FM dithering or error diffusion processing can also be used as halftone processing. In that case, the resolutions of dithering and error diffusion is switched in response to the determined hue area the same as in the first embodiment.

Also, in the second embodiment, dithering or error diffusion is applied to input image data. Alternatively, different halftone processing can be applied to the same image data. That is, processing results of FM dithering and error diffusion become almost the same, so execution of both processes can be allowed. By contrast, since processing types of AM dithering and FM dithering, and AM dithering and error diffusion processing are different, execution of those processes cannot be allowed. This is to prevent continuity of gradation in gradation pattern from looking disturbed and unintentional three-dimensional effect from being generated when regularity of dot placement is different before and after conversion.

Third Embodiment

In the present invention, since color difference is expressed by changing the LPI or resolution of halftone processing, continuity of gradation in gradation pattern looks disturbed and an unintentional three-dimensional effect is generated if screen angle and halftone dot pattern is different as described above. In that case, people with color amblyopia cannot recognize the color difference.

To cope with that issue, in a third embodiment, the screen angle is set to the same value and the halftone dot pattern is set to the same tendency in each hue area. FIG. 4 (a) illustrates an example of different screen angles (line screen dithering process), and FIG. 4 (b) illustrates an example of different halftone dot patterns. In this third embodiment, if dithering process of, e.g., 45 degrees, as screen angle is used, a screen angle of 135 degrees is not used.

It should be noted that this does not mean that screen angles are common for each CMYK region as output color. For example, red is expressed by M and Y, and green is expressed by C and Y. In the present invention, while different halftone processing is executed between Y used in red and Y used in green, the same screen angle is used for both Y used in red and Y used in green. By contrast, it is not necessary to set the same screen angle for M and Y.

Fourth Embodiment

In the present invention, the LPI or resolution of halftone processing is different for each hue. In a fourth embodiment, in response to the resolution of the original image (input image), the output image has a resolution (LPI in case of AM dithering) of n times and n×m times, or 1/n times and 1/(n×m) times to make processing simple (n and m are integers larger than 2), so that people with amblyopia can use roughness (granularity) of the dot pattern to recognize color differences. Also, n and m are integers larger than 2 to keep control cost low. (If decimal is allowed, resolution by a factor of at least ten or more is necessary.)

Practically, regarding controlling a recording apparatus, it is difficult to set different resolution in the same screen area. For example, in case of forming a 300 dpi dot (low resolution) on a recording apparatus in 600 dpi (high resolution), low resolution dot is simulated by placing a cluster (halftone dot) formed by concentrating 600 dpi dots at the corresponding position of 300 dpi coordinates as shown in FIG. 5 (a).

Fifth Embodiment

In a fifth embodiment, gradation characteristics are not different among halftone processing applied to each hue. Also, in the outputable maximum gradation, it is not all one color but limited to a level (pattern) that can recognize layout of dots (or dot clusters, halftone dots) by halftone processing as shown in FIG. 5 (b). Doing so can prevent gradation characteristic from changing by switching halftone processing, and prevent the dot pattern itself from disappearing by not outputting all one color. In this fifth embodiment, color universal design taking into account both people with color amblyopia and people with no disabilities can be provided by switching halftone processing for each hue area.

Sixth Embodiment

In a sixth embodiment, color universal designing is switched in response to type of input image. Since it is possible to generate partial lack or jagged edge if AM dithering is executed on characters and line drawings, color universal design is switched depending on whether or not the input image is a bitmap object such as a photograph or an illustration.

That is, the type of input image, whether text and line drawing, or photograph and illustration, is determined for each targeted pixel of the input image by image area separation. If the image is a text and line drawing, conventional color universal design (replacing colors and adding different pattern or texture for each color) is applied. If the image is a photograph or illustration, color universal design according to the present invention is applied.

The color universal design described above can be specified from a control panel or control program of the recording apparatus, or can be specified via network by an operator. Also, processing can be selected automatically based on recording process instructions included in input image data without specifying by an operator. Furthermore, the color universal design of this invention can be called up from a program as software or embedded in an ASIC as a hardware circuit. It can also be embedded in a stand-alone recording apparatus that executes everything from image processing to printing, or a recording system that executes through printing in combination with a plurality of apparatuses.

The present invention can also be achieved by supplying a storage medium that stores program code implementing functions of those embodiments described above, and reading and executing the program code stored in the storage medium by CPU or MPU in the system or the apparatus. In this case, the program code itself read from the storage medium implements functions as those embodiments described above. Hard disks, optical disks, magneto-optical disks, non-volatile memory cards, and ROMs and the like may be used as the storage medium that provides the program code. Also, it is the case not only implementing functions of those embodiments described above, but also implementing functions of those embodiments described above by executing part or all of actual processes and implementing functions of those embodiments described above by operating system running on the computer based on instructions of the read program codes. Furthermore, after program code read from the storage medium is written in memory installed on a function expansion board inserted in a computer or a function expanding unit connected to a computer, functions of embodiments described above can be implemented by executing part or all of actual processes by CPU installed on the function expansion board or the function expanding unit based on instructions of the program code. Also, program that implements functions of the embodiments of the present invention can be provided from a server via a network.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. A image processing system, comprising:
   an image input unit;
   a hue determining unit to determine hue of an image;
   a color matching processing unit that converts RGB signals of the input image determined by the hue determining unit into CMYK signals;
   a γ correction processing unit that corrects gradation characteristics of the input image data;
   a selecting unit to select halftone processing in accordance with the determined hue;
   a halftone processing unit to convert the image into an image having a different granularity degree from that of the input image by subjecting the input image data to the selected halftone processing; and
   an image output unit,
   wherein the image is simulated with the same gradation characteristic regardless of the selected halftone processing.

2. The image processing system according to claim 1, wherein the selecting unit selects halftone processing with different resolutions depending on the determined hue.

3. The image processing system according to claim 1, wherein the halftone processing is one of AM dithering, FM dithering, and error diffusion processing.

4. The image processing system according to claim 3, wherein the same halftone dot pattern after processing the AM dithering is used regardless of the determined hue in case the AM dithering is selected.

5. The image processing system according to claim 1, wherein replacing colors and adding different patterns or textures for each color is applied if the image is in text or line drawing area, and selecting halftone processing in accordance with the hue and converting the image into image with different granularity.

6. A method of processing image data, comprising the steps of:
   determining hue of an image;
   selecting halftone processing in accordance with the determined hue; and
   converting the image into an image with a different granularity degree from that of the input image using the selected halftone processing,
   wherein the image is simulated with the same gradation characteristic regardless of the selected halftone processing.

7. A non-transitory computer-readable storage medium storing a program that, when executed by a computer, causes the computer to implement a method of processing image data,
   the method comprising the steps of:
   determining hue of an image;
   selecting halftone processing in accordance with the determined hue; and
   converting the image into an image with a different granularity degree from that of the input image using the selected halftone processing,
   wherein the image is simulated with the same gradation characteristic regardless of the selected halftone processing.

* * * * *